Aug. 24, 1965  S. B. LONDON  3,202,148
BLOOD PRESSURE MONITOR
Filed Nov. 27, 1962  2 Sheets-Sheet 1
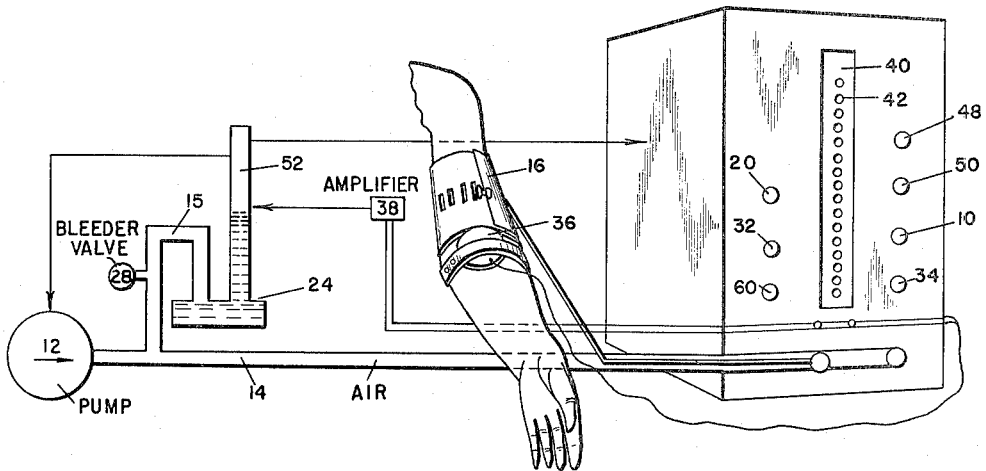
FIG. 1
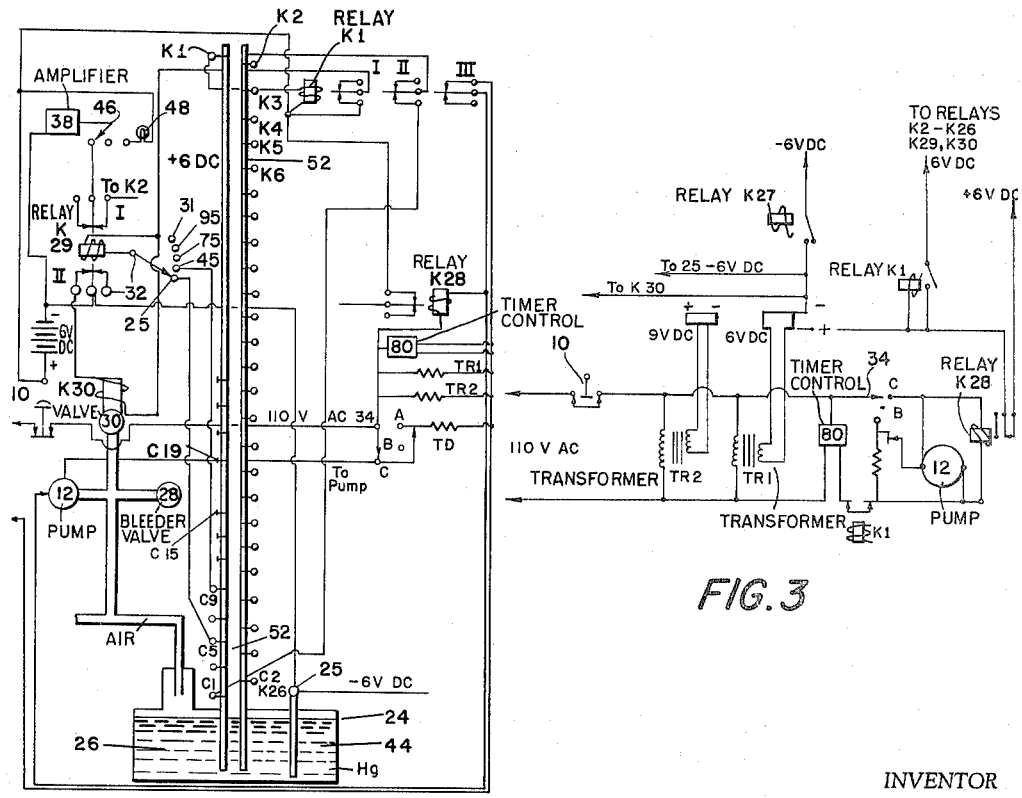
FIG. 2
FIG. 3
INVENTOR
SEYMOUR B. LONDON
BY Semmes and Semmes
ATTORNEYS Aug. 24, 1965  S. B. LONDON  3,202,148
BLOOD PRESSURE MONITOR
Filed Nov. 27, 1962  2 Sheets-Sheet 2

INVENTOR
SEYMOUR B. LONDON
BY Semmes and Semmes
ATTORNEYS

United States Patent Office 3,202,148
Patented Aug. 24, 1965

3,202,148
BLOOD PRESSURE MONITOR
Seymour B. London, 35 E. Dilido Drive, Dilido Ave.,
Miami, Fla.
Filed Nov. 27, 1962, Ser. No. 240,313
7 Claims. (Cl. 128—2.05)

The present application relates to a blood pressure monitor or manometer device for determining and visually presenting systolic and diastolic blood pressure readings.

Blood pressure monitor devices are designed to determine systolic and diastolic blood pressure.

The present apparatus both electronically and electrically effects (1) rapid inflation and slow deflation of a compression cuff to levels and rates suitable for recognition of the blood pressure, (2) detection of the sounds produced at the artery (Korotkow sounds), and (3) conversion of the level of pressure at which the sounds are heard to numerical equivalents of millimeters of mercury which are made visible on an illuminated panel easily read and recognizable. These values remain illuminated at all times until the next Korotkow sound is detected and the corresponding millimeters of mercury is recorded.

The device cycles through the numerous steps at constant recycling intervals. An interval delay mechanism allows the intervals between cycles to be set as desired. Unless disconnected or stopped by the on-off button, the apparatus will continue to function indefinitely.

The present device distinguishes from previous devices in its economy of construction and its unique capability of providing "read out" visual determination of both systolic and diastolic blood pressures, the visual presentations of these pressures occurring only upon amplification of the detected Korotkow sounds. Earlier devices have provided for visual presentation of millimeters of mercury in column and activation of alarms when pressure exceeds pre-established critical limits in the mercury column. None of the previous devices have provided through a series of independent circuit means for continuing visual presentation of the millimeters of mercury in column precisely as the Korotkow sounds are detected.

Accordingly, it is an object of invention to provide in a single device means for inflating and deflating a compression cuff to pre-set levels, detecting the Korotkow sounds and converting said sounds to visual indicia.

Another object of invention is to provide a blood pressure monitor device wherein both systolic and diastolic pressures are visually presented.

Another object of invention is to provide in a blood pressure monitor device of the type having a mercury column and visible indicators correlative to height of mercury in the column, means for selectively activating the visible indicators as the Korotkow sounds are detected.

Yet additional objects of invention will become apparent from the ensuing specification and attached drawings wherein:

FIG. 1 is a schematic view of the blood pressure monitor with cuff 16 and microphone 36 affixed adjacent the brachial artery;

FIG. 2 is a schematic view of the pump and manometer column circuits wherein mercury is elevated by means of pump 12;

FIG. 3 is a schematic view of the main power supply circuit;

Figure 4:
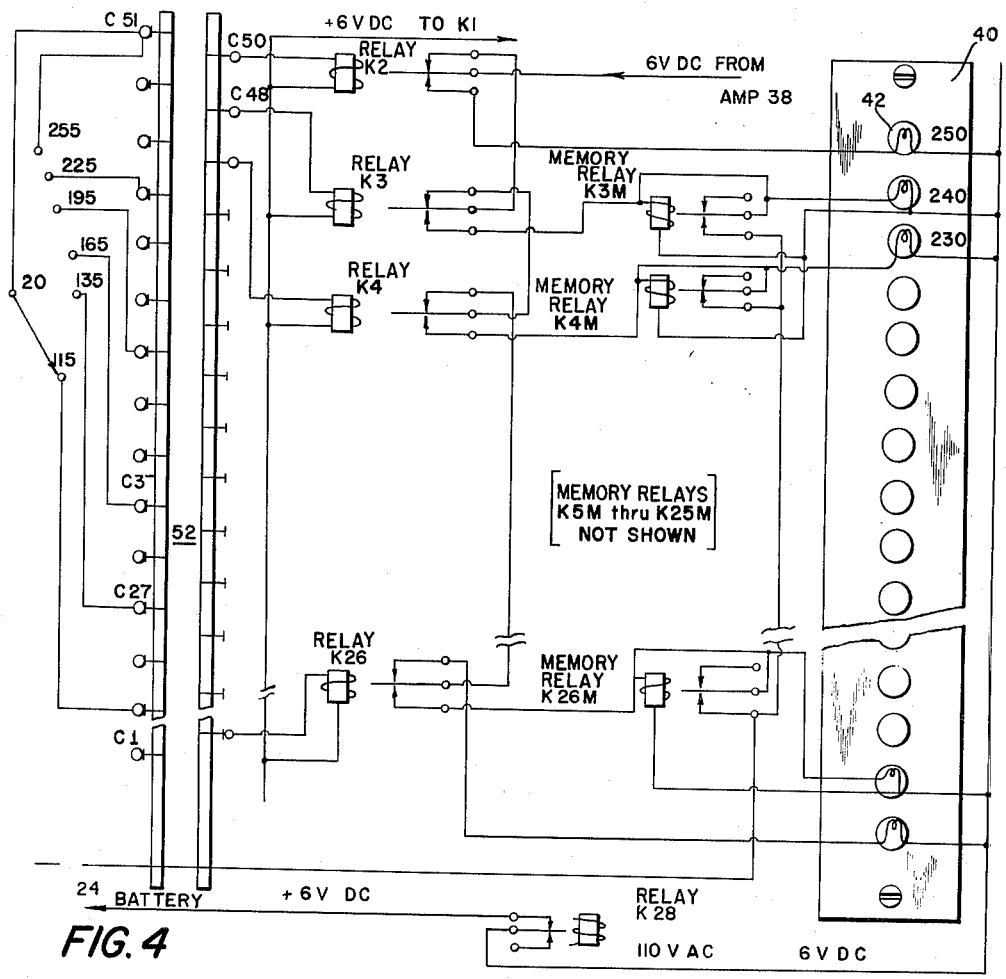
Figure 5:
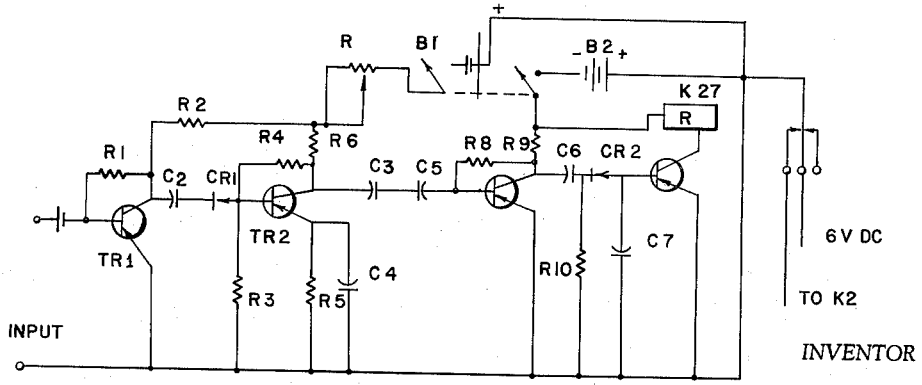

FIG. 4 is a schematic view of manometer column 24 adjacent the visual display panel 40 having visual lamps corresponding to pressure levels in column 24; and FIG. 5 is detailed schematic of a proposed amplifier circuit.

The activity is initiated by a push-button "On-Off" switch 10, starting the pump 12 which by tubes 14 leads to a standard arm compression cuff 16 and inflates cuff 16 to a preselected level sufficient to compress the brachial artery. For simplicity pressure select switch 20 has three ranges: High (255 mm.), Medium (165 mm.), and Low (135 mm.). The low range is of value in shock states, the medium range is useful under normal situations; and the high range for monitoring instances of high blood pressure.

By a T tube connection 15 from the compression cuff supply tube 14, the main sensing device or Manometer Regulator 24 detects the pressure level in cuff 16 serving as a switch to stop pump 12 at the desired level of pressure. Manometer Regulator 24 is so constructed that for every five millimeters of mercury pressure a separate and independent electronic circuit is activated. This is accomplished by fifty-one contact points placed five millimeters apart on the mano-regulator column 52. Contact C1 at the bottom represents 5 millimeters of mercury pressure; contact C2—represents 10 millimeters of mercury pressure, etc. Therefore, because of its multiple independent circuits the manometer regulator 24 distinguishes electronically when pressures corresponding to each contact point are reached and by a system of electromagnetic relays acting as switches, signals received through each independent circuit are then translated into specific types of action.

When pump 12 is stopped, cuff 16 slowly decompresses by means of a "bleeder" valve 28 to atmospheric pressure. The rate of decompression can be varied but for comfort and usefulness a rate of 5–10 millimeters per second has proven satisfactory. By means of solenoid valve 30, rapid deflation of the cuff is accomplished after the diastolic level has been determined. There is a diastolic termination switch 32 which regulates the lower end of the cycle terminating the cycle rapidly when compression is of no further use. Again for useful levels it has been found that 95, 75, 45, and 25 millimeters of mercury represented by contacts 31 valuable but not exclusive points to terminate the cycle, depending on the expected level of diastolic blood pressure.

This function is accomplished through valve 30 by the Manometer Regulator 24 which, sensing the pressure level in cuff 16 activates the relay system K29 and K30, releasing the open contact of the solenoid coil and simultaneously interrupting the amplifier signal. When zero pressure is reached Manometer Regulator 24 reverts to starting condition and unless a time interval delay is desired the device will automatically recycle. Each cycle is accomplished in 20 to 30 seconds. By means of an interval selector switch 34 interval delays can be interposed between cycles.

As illustrated in FIG. 3 and in order to avoid artifact and inaccuracy a magnetic relay, K28, operates simultaneously with pump 12 during the compression cycle and by interrupting the 6 volt D.C. main, interrupts the memory relays of the illuminated panel so that the previous reading is wiped off at the start of a new cycle.

During the decompression cycle the sensitive low frequency microphone 36 placed on the brachial artery distal upon or below compression cuff 16 will detect the Korotkow sounds generated by the blood pressure. The first Korotkow sound detected as cuff 16 over the artery is decompressed thus restoring the patency of the temporarily obliterated artery, determines the systolic blood pressure, and the last sound detected is the diastolic blood pressure. The range in millimeters of mercury between systole and diastole is called the pulse pressure; this is the only period in which Korotkow sounds can be detected over an artery. Microphone 36 which detects these sounds is led to the low frequency, sensitive transistorized amplifier 38 whose output is changed by means of a sensitive relay, K27, into a −6 volt D.C. signal. This −6 volt D.C. signal is led to the mano-regulator 24 which accepts into its independent circuits signals received at each 5 millimeters of mercury pressure. Therefore, a signal detected at any given pressure will be accepted only by the independent circuit corresponding to that pressure. The amplifier signal activates a memory relay system, K3M through K26M, and a signal light 42 in the panel 40 corresponding to this specific circuit illuminates respective lamp 42 which is the numerically equivalent to the pressure in the mercury column. This numbered value remains illuminated until the initiation of the next cycle through the adjacent independent circuit in manometer regulator 24.

FIGURE 2 illustrates in greater detail the circuitry of pump 12. 110 volt A.C. current supplies the power of the pump 12 and is converted by a transformer, TR1, and rectifier (not illustrated) to 6 volt D.C. for the signal light and illuminated panel system via relays K1 through K26 and K29 and K30.

A second transformer, TR2, supplies power for the 9 volt D.C. (B battery) to the amplifier and sensitive relay K27 in the amplifier output.

In FIGS. 2 and 3 "On-Off switch 10 and the D.C. battery elements are twice illustrated in order that their connections may be fully discussed. Switch 10 is a push-button "On-Off" switch which closes the 110 volt A.C. main line. The main line is led through both transformers to the timer control device 80 which allows interval delays between cycles, to interval selector switch 34, the pump control switch, which has three positions. Position A is a fixed time-delay (T.D.) circuit of 30 seconds; position B disconnects pump 12 so that the amplifier 38 and signal circuit are still operating; and position C allows for continuous recycle without interval delay. The 110 volt A.C. current supplying pump 12 also activates relay K28 which acts as a switch to open the 6 volt D.C. main supplying illuminated panel 40 thereby wiping off the previous values. FIGURE 2 illustrates this in somewhat more detail. The 110 volt A.C. current line to pump 12 is led to Pole III of K1 relay which acts as a switch allowing A.C. current to flow through its normally closed contacts energizing pump 12. Pump 12 builds up pressure in tubes 14 and arm compression cuff 16 which is transmitted also to the manometer regulator 24. When the pressure is reservoir 44 of the mano-regulator is increased, the mercury 26 of the reservoir is forced up column 52. Because the negative lead of the 6 volt D.C. power supply is connected to the mercury reservoir by contact 25, the rising mercury column acts as a negative 6 volt D.C. lead to the various contacts in the vertical column. When the mercury column reaches the contact to relay K1 (contact 51), K1, a three pole DT 6 volt D.C. relay is activated. Pole III stops the pump by opening the circuit of the 110 volt A.C.

Pole II of relay K1 supplies a "hold" lead to K1 by supplying negative 6 volt D.C. current from contact 1 on the mercury column which is just above zero (atmospheric) pressure. When the mercury column falls below this contact, the current supply to K1 is interrupted, K1 becomes inactivated, and the pump cycle restarts unless a delay mechanism is operated.

Pole I of relay K1 closes the circuit supplying the 6 volt D.C. positive lead to relays K2 through K26, K29 and K30. When this circuit of K1 is closed, these relays (K2 through K26, K29 and K30) close simultaneously, as the negative lead in mercury column 52 already is in contact with the various contacts on mano-regulator 24. Since K29 is also closed, the amplifier signal is now led to the contacts of K2 which in the active position switches the amplifier signal of −6 volt D.C. to the illuminated panel 40 as illustrated in FIGURE 4. The contact 50 for K2 on the manometer regulator corresponds to a pressure level of 250 millimeters of mercury or greater. The amplifier signal is thus caused to flash the illuminated panel light 42 corresponding to 250. This panel light will flash synchronously with the Korotkow sounds. The function of K2 therefore is to indicate by the flashing signal that the blood pressure is over 250 millimeters of mercury. As cuff 16 is decompressed by the bleeder valve 28, mercury column 52 falls at a rate of 5–10 millimeters per second. When the −6 volt D.C. contact of K2 (C50) with the mercury is interrupted and K2 becomes inactive, the amplifier signal is then led through the normally closed contacts of K2 to K3 which is then in the active state. This is illustrated in FIGURE 4.

K3 is able to receive the signal only during this period, i.e., when it is "active" and when K2 is "inactive." At this time K3 serves as a switch to allow the amplifier signal to be led to K3M. K3M is a memory relay so supplied that the −6 volt D.C. amplifier signal pulls in K3M which is then supplied by its own contacts with −6 volt D.C. and therefore holds the "active" position. The signal light corresponding to K3M on the illuminated panel is numerically represented by the figures "240." Since K3 (contact 48 on the mercury column) corresponds to 240 millimeter of mercury, a signal received at K3 will be represented on the illuminated panel by the K3M system (during its active state) with the illumination of the number 240.

Because K3 becomes inactive when the mercury falls below its contact point, signals received below this point for example at C46 will be received only by K4, which in turn similarly serves to switch the amplifier signal to the K4M system which corresponds to 230 millimeters of mercury and the illuminated panel indicating the figure 230 will be illuminated if a signal is detected. Therefore, as mercury column 52 continues to drop K3 through K26 will in turn be receptive to signals one at a time and accordingly the corresponding K3M to K26M memory systems indicating the numerical value of the pressure where Korotkow sounds are detected will be illuminated on the panel "one at a time" and retained.

Because blood pressure in different individuals under different circumstances may be at various levels, it may be desirable to limit the range of monitoring. The upper limits of the compression cycle can be selected by pressure select switch 20, as illustrated in FIGURE 4. Switch 20 has multiple positions so that the contact 51 from relay K1 can be shorted from the contact corresponding to 225 millimeters of mercury (contact 51) to the various contacts below this point. Practically, three positions are very useful: contact 51, which corresponds to 255 millimeters of mercury; contact 33, which corresponds to 165 millimeters of mercury; and contact 27, which corresponds to 135 millimeters of mercury, which limits the compression cycle to high, medium, and low ranges.

After the diastolic level has been determined further compression of the cuff is undesirable and rapid decompression is accomplished by termination switch 32, FIG. 2 which regulates the contacts of relays K29 and the solenoid valve contact K30. K29 is represented as a 6 volt D.C. relay with 2 poles; in the unenergized or inactive position, the amplifier signal circuit pole I —6 volt D.C. is open so that the mano-regulator and its relay system will be uneffected by noise, movement, and other causes of artifact between cycles. Through the normally closed contact of K29, pole 2 supplies —6 volt D.C. lead to K30, adjacent the solenoid valve 30. This valve is normally closed and when energized the solenoid valve 30 decompresses the manometer regulator cuff system. Since the positive 6 volt D.C. lead to K30 is not energized during the compression cycle, K30 will be energized only in the decompression cycle after the mercury column drops below the contact point supplying K29. Termination switch 32 has four principally useful positions: Zero position allows decompression to occur at a rate of 5–10 millimeters per second until contact 1 is passed by the mercury column and the recycle starts; position 1 (contact 5) allows slow decompression to the level of 25 millimeters of mercury, then rapid decompression; position 2 (contact 9) stops the slow decompression and ends the cycle at 45 millimeters of mercury; position 3 (contact 15) ends the cycle at 75 millimeters; position 4 (contact 19) ends diastolic cycle at 95 millimeters.

The amplifier 38 FIG. 5 consists of a preamplifier section supplied by 3 volt battery and the amplifier and its output the relay K27. The amplifier circuit can by means of switch 46 (see FIGURE 2) be used to monitor heart rate or pulse by means of a signal light 48 (6 volt D.C.) on the control panel. This light 48 is supplied by the —6 volt D.C. from the amplifier signal and the +6 volt D.C. from the 6 volt D.C. main. Switch 60 is a combination Off-On-volume control for the amplifier. A pilot light 50 may also be provided. B1 is a 3 volt penlight battery supplying the preamplifier section. B2 is a 9 volt battery but also reliable operation is achieved from a 9 volt D.C. power supply (transformer TR2). Transformer #1 supplies the power for the 6 volt D.C. power.

By way of summary, the basic operation of the blood pressure monitor apparatus is as follows. After the patient has secured his wrist in cuff 16 and the microphone 36 is placed on the brachial artery in a position to detect the Korotkow sounds created by the blood pressure, switch 10 is turned on, thus causing cuff 16 to be inflated to a preselected level sufficient to compress the brachial artery. The level to which cuff 16 is inflated is regulated by pressure select switch 20. After the pump 12 is stopped, cuff 16 slowly decompresses by means of "bleeder" valve 28. The manometer regulator 24 detects the pressure changes in cuff 16 and its reading drops as cuff 16 is decompressed by bleeder valve 28. Each time the pressure level in manometer regulator 24 drops five millimeters, a separate electronic circuit is activated, which action in turn is translated to the display panel 40. When zero pressure is reached the manometer regulator 24 reverts to its starting condition and the apparatus begins its next cycle. When a Korotkow signal is detected at a particular pressure, it is accepted only by the independent circuit corresponding to that pressure. The signal actuates the memory relay system which causes the signal light, which is numerically equivalent to the pressure in the manometer regulator 24, to be actuated. This pressure level value on the display panel remains illuminated until initiation of the next cycle.

By use of appropriate recorders the present device can give long term observation of blood pressure under different circumstance, sleep activity, eating activity and the like can be monitored.

A further but not exclusive elaboration is the use of the device to automatically react to variation in the blood pressure. Alarms can be given when pressures too high or too low are present. Systems to control medication or therapy can be started or stopped to regulate blood pressure.

Manifestly various substitution of parts and changes in circuitry can be adapted without departing from the spirit and scope of invention defined in the sub-joined claims.

I claim:
1. A method of blood pressure monitoring comprising:
(A) pressurizing a sound detecting cuff adjacently positioned to a blood containing artery and a mercury column;
(B) electrically energizing said mercury column and a visual display indicia so both said column and indicia will be responsive to changes in pressure within said cuff;
(C) detecting Korotkow sounds through said cuff and limiting energization of said visual display indicia, except as said Korotkow sounds are detected.

2. A blood pressure monitor apparatus comprising:
(A) an inflatable cuff;
(B) pump inflating means in communication with said cuff;
(C) a bleeder valve positioned intermediate said pump inflating means and said cuff to allow said cuff to slowly decompress;
(D) electrically conductive detector means in communication with said cuff and responsive to the pressure gradient in said cuff;
(E) a display panel electrically connected to said pressure responsive detector, said display panel including visual indicia means corresponding to the pressure level gradients in said detector;
(F) a source of electrical energy supplying said pump inflating means, detector means, and display panel; and
(G) sound detecting means in communication with said cuff and relayed to said visual indicia independently of said source of electrical energy supplying said pump inflating means, detector means and display panel so as to limit electrical energization of said indicia, except as sounds are detected.

3. A blood pressure monitor as in claim 2, including a pressure select switch in circuit with said pressure responsive detector means and said pump inflating means, said pressure select switch being actuable within said detector means to cut off said source of electrical energy from said pump inflating means at a predetermined pressure.

4. A blood pressure monitor as in claim 3, including a decompression valve in communication with said cuff and a pressure responsive switch interconnecting said detector means and said valve, gauging decompression according as pre-set pressure values are detected by said detector means.

5. A blood pressure monitor as in claim 4, including an interval control switch in said circuit closing said source of electrical energy with said pump inflating means at predetermined intervals.

6. A blood pressure monitor as in claim 2, said sound detecting means including a microphone and amplifier in an independent circuit, said microphone being positionable adjacent said cuff.

7. A blood pressure monitor apparatus comprising:
(A) an inflatable cuff;
(B) pump inflating means including a conduit in communication with said cuff;
(C) a bleeder valve positioned in said conduit to allow said cuff to slowly decompress;
(D) an electrically conductive pressure responsive mercury column detector in communication with said conduit;
(E) a display panel electrically connected via a series of independent circuits to respective pressure gradient points in said pressure responsive detector, said display panel including visual indicia means corresponding to pressure level gradients in said detector;
(F) a source of electrical energy supplying said pump inflating means, detector and display panel;
(G) a pressure select switch in circuit with said detector and said pump inflating means, said pressure select switch being actuable within said detector to cut off said source of electrical energy from said pump at a predetermined pressure;

(H) a decompression valve in said conduit and a pressure responsive switch interconnecting said detector and said valve, gauging decompression according as a pre-set pressure is detected in said detector;

(I) an interval control switch in circuit with said source of electrical energy and closing said source of energy with said pump inflating means at predetermined intervals; and (J) sound detecting means in communication with said cuff and independently relayed to said visual indicia, so as to limit electrical energization of said indicia, except as sounds are detected.

References Cited by the Examiner

UNITED STATES PATENTS

| | | | |
|---|---|---|---|
| 2,352,875 | 7/44 | Williams | 128—2.05 |
| 2,821,188 | 1/58 | Pigeon | 128—2.05 |
| 2,827,040 | 3/58 | Gilford | 128—2.05 |
| 3,051,165 | 8/62 | Kompelien | 128—2.05 |

RICHARD A. GAUDET, *Primary Examiner.*

LOUIS R. PRINCE, *Examiner.*